United States Patent
Davis et al.

(10) Patent No.: US 9,098,459 B2
(45) Date of Patent: Aug. 4, 2015

(54) ACTIVITY FILTERING BASED ON TRUST RATINGS OF NETWORK

(75) Inventors: Malcolm H Davis, Kirkland, WA (US); Aravind K Ramachandran, Redmond, WA (US); Geoffrey J Hulten, Lynnwood, WA (US); Ivan Osipkov, Bellevue, WA (US); Milenko Drinic, Bellevue, WA (US); Eliot C. Gillum, Mountain View, CA (US); Krishna C. Vitaldevara, Fremont, CA (US); Jason D. Walter, San Jose, CA (US); Mehrdad Bidgoli, San Francisco, CA (US); Robert L. McCann, Fall City, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1032 days.

(21) Appl. No.: 12/697,170

(22) Filed: Jan. 29, 2010

(65) Prior Publication Data

US 2011/0191847 A1 Aug. 4, 2011

(51) Int. Cl.
| | | |
|---|---|---|
| G06F 11/00 | (2006.01) | |
| G06F 15/16 | (2006.01) | |
| H04L 29/06 | (2006.01) | |
| G06F 15/173 | (2006.01) | |
| G06F 21/00 | (2013.01) | |

(52) U.S. Cl.
CPC .............. *G06F 15/16* (2013.01); *G06F 15/173* (2013.01); *G06F 21/00* (2013.01); *H04L 63/0236* (2013.01); *H04L 63/1425* (2013.01)

(58) Field of Classification Search
CPC ................. H04L 63/0236; H04L 63/1425
USPC ............................................ 709/206; 726/22
See application file for complete search history.

(56) References Cited

U.S. PATENT DOCUMENTS

| | | | |
|---|---|---|---|
| 6,748,434 B2 | 6/2004 | Kavanagh | |
| 6,944,775 B2 | 9/2005 | Barton et al. | |
| 7,206,814 B2 | 4/2007 | Kirsch | |
| 7,219,148 B2 | 5/2007 | Roundwaite et al. | |
| 7,475,118 B2 * | 1/2009 | Leiba et al. ................... | 709/206 |

(Continued)

OTHER PUBLICATIONS

Ramachandran et al., Understanding the Network-Level Behavior of Spammers, 2006, Retrieved from the Internet <URL: dl.acm.org/citation.cfm?id=1159947>, pp. 1-12 as printed.*

(Continued)

*Primary Examiner* — Michael Chao
(74) *Attorney, Agent, or Firm* — Bryan Webster; Kate Drakos; Micky Minhas

(57) ABSTRACT

The filtering of activities generated by nodes of a network while interacting with a device may be performed by evaluating the desirability of the activities (e.g., a spam or not-spam determination of email messages sent by the node) and assigning a trust rating to the node. However, nodes are often identified by network address, and an operator of a node sending undesirable activities may reassign the network address of the node in order to avoid heavy filtering. Instead, nodes may be identified as being controlled by a network entity (e.g., an autonomous system identified in a border gateway protocol routing table.) The network entity is assigned a network entity trust rating based on the trust ratings of the nodes controlled thereby, and an appropriate level of activity filtering based on the network entity trust rating may be selected for subsequent activities received from all nodes controlled by the network entity.

20 Claims, 8 Drawing Sheets

(56) References Cited

U.S. PATENT DOCUMENTS

| | | | |
|---|---|---|---|
| 7,487,217 | B2 | 2/2009 | Buckingham et al. |
| 7,606,214 | B1 | 10/2009 | Chandra Sekhar et al. |
| 7,610,342 | B1 | 10/2009 | Pettigrew et al. |
| 7,610,344 | B2 | 10/2009 | Mehr et al. |
| 2002/0147780 | A1 | 10/2002 | Liu et al. |
| 2003/0167321 | A1 | 9/2003 | White |
| 2005/0171954 | A1* | 8/2005 | Hull et al. ............ 707/10 |
| 2006/0031483 | A1 | 2/2006 | Lund et al. |
| 2006/0095586 | A1* | 5/2006 | Adelman et al. ......... 709/245 |
| 2006/0168041 | A1 | 7/2006 | Mishra et al. |
| 2008/0126344 | A1 | 5/2008 | Hoffman et al. |
| 2008/0133672 | A1 | 6/2008 | Gillum |
| 2008/0320119 | A1 | 12/2008 | Achan et al. |
| 2009/0013054 | A1 | 1/2009 | Libbey et al. |
| 2009/0265786 | A1 | 10/2009 | Xie et al. |
| 2009/0282476 | A1 | 11/2009 | Nachenberg et al. |
| 2009/0327430 | A1 | 12/2009 | Colvin et al. |
| 2011/0191832 | A1 | 8/2011 | Davis et al. |

OTHER PUBLICATIONS

RFC 4217, 2006, Retrieved from the Internet <URL: www.ietf.org/rfc/rfc4271.txt.pdf>, pp. 1-104 as printed.*

"PreciseMail Overview—The Email Threat"—Published Date: Nov. 13, 2006 http://www.process.com/precisemail/Technical%20Overview.pdf.

"Reputation-Based Mail Flow Control"—Published Date: Apr. 23, 2006 http://www.ironport.com/pdf/ironport_reputation_based_control_whitepaper.pdf.

Taylor; Bradley, "Sender Reputation in a Large Webmail Service"—Published Date: Aug. 13, 2006 http://www.ceas.cc/2006/19.pdf.

Hao; et al., "Detecting Spammers with SNARE: Spatio-Temporal Network-Level Automatic Reputation Engine"—Published Date: Aug. 2009 http://www.usenix.org/events/sec09/tech/full_papers/hao.pdf.

"Sendmail IP Reputation Service"—Published Date: Oct. 17, 2007 http://www.sendmail.com/pdfs/resources/WhitePapers/ds_5.07_ip_reputation.pdf.

Milenko Drinić, Robert McCann, and Geoff Hulten. URL IP Spam Filtering. Windows Live Safety Applied Research Report. Oct. 2007. http://team/sites/safety/appliedresearch/Shared%20Documents/URLIPSpamFiltering_Report.docx.

Milenko Drinić. URLs in Spam Emails. Windows Live Safety Applied Research Note, Jul. 2007. http://team/sites/safety/appliedresearch/Shared%20Documents/URLs%20in%20Spam%20Emails_Early_2007_Data.docx.

Ivan Osipkov, Milenko Drinić, and Geoff Hulten. DNS Servers and Criminal Spam Infrastructure. Windows Live Safety Applied Research Report. Jan. 2009. http://team/sites/safety/appliedresearch/Shared%20Documents/DNS%20Servers%20and%20the%20Criminal%20Spam%20Infrastructure%20(Part%201).docx.

Milenko Drinić. Applied Research Data Intelligence Platform. Windows Live Safety Applied Research Note. Apr. 2008. http://team/sites/safety/appliedresearch/Shared%20Documents/ARDIPlatform.docx.

McAfee Anti-Spam: Protecting Your Organization from Spam, Phishing and Other Unsolicited Messages—Published Date: Oct. 2006 http://www.mcafee.com/us/local_content/white_papers/anti_spam.pdf.

Zhao, et al., "BotGraph: Large Scale Spamming Botnet Detection", http://www.usenix.org/events/nsdi09/tech/full_papers/zhao/zhao_html/Published Date: Apr. 2009, pp. 1-26.

"Reputation-Based Mail Flow Control", Ironport Systems, Inc. http://www.ironport.com/pdf/ironport_reputation_based_control_whitepaper.pdf Published Date: Oct. 15, 2007, pp. 1-5.

Gros, et al.; "Reputation based Protection of ISPs"; http://www.zemris.fer.hr/~sgros/publications/wip/reputation-v01.pdf.; Retrieved Date: Jan. 28, 2010.

Non Final Office Action cited in U.S. Appl. No. 12/697,179 Dated: Apr. 20, 2012, pp. 1-13.

Response to Non Final Office Action cited in related U.S. Appl. No. 12/697,179 Dated: Jul. 20, 2012, pp. 1-16.

Notice of Allowance cited in related U.S. Appl. No. 12/697,179 Dated: Oct. 2, 2012 pp. 1-14.

* cited by examiner

ACTIVITY FILTERING BASED ON TRUST RATINGS OF NETWORK

BACKGROUND

Many computing scenarios involve a network connecting a device with one or more nodes of the network, and that particularly involve the filtering of activity of the nodes while interacting with the device. For example, an email server may receive email from many nodes, but may filter out unsolicited bulk email messages ("spam") from desired email messages; a webserver may be configured to differentiate legitimate web requests from unproductive web requests, such as disingenuous requests submitted as a denial-of-service attack; and a file server may wish to provide service while identifying and blocking intrusion attempts (e.g., attempts to install malware in order to commandeer the server for a "botnet" controlled by another individual.)

In each of these scenarios, it may be desirable to implement filtering techniques on the device that successfully identify and exclude unwanted activity and that reduce the frequency of accidentally excluding wanted activity (e.g., a "false positive" in a filtering scheme), while efficiently utilizing the resources of the device (e.g., memory, network capacity, and processor usage) in performing the filtering. In the particular scenario of unsolicited bulk email messages, filtering techniques often involve various properties of the email messages, such as blacklists of notorious or suspected spammers, whitelists of senders that are believed to be acceptable to recipients of such email messages, and keywords that are often included in spam email messages (such as the names of popular pharmaceuticals that are often advertised for sale via spam email messages.) Increasing the aggressiveness of these filtering techniques may successfully reduce the delivery of spam email messages, but may also raise the number of "false positives" of non-spam email messages that are incorrectly identified as spam by the filtering techniques and withheld from delivery to users.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Alternatively or in addition to the filtering of particular activities of a node interacting over a network with the device, techniques may be devised for identifying particular nodes that are believed to engage in high volumes of undesirable activity (such as sending unsolicited bulk email messages, participating in denial-of-service attacks, and/or attempting to deliver malware to the device.) For example, each node may have a particular network address on the network, and a list may be generated that identifies a trust rating of the node at a particular network address, such as a blacklist of nodes having a low trust rating (such that the activities of such nodes may be more aggressively filtered, throttled, or completely blocked) and whitelists of nodes having a high trust rating (such that the activities of such nodes may be less aggressively filtered or unthrottled.) However, one difficulty with this technique involves the proclivity of the perpetrators of undesirable activity (e.g., spammers, hackers, and botnet operators) to determine that the network address of a node has been blacklisted, and to switch to a different network address (which is not yet blacklisted) in order to continue the unwanted activity. For example, an individual may register a particular domain having up to 256 distinctive network addresses (e.g., the domain may be assigned by a network registrar to all internet protocol (IP) addresses between 32.64.128.0 and 32.64.128.255), and may frequently assign a new network address to a node in order to avoid the blacklisting of the node.

Presented herein are techniques for assigning trust ratings to network entities based on evaluations of activity of various nodes interacting with the device over the network, where such techniques may reduce the avoidance of blacklisting through the switching of network addresses. These techniques involve the mapping of ranges of network addresses (such as blocks of IP addresses) to a particular network entity. For example, the border gateway protocol (BGP) utilized by various network routers to establish routes of data packets may identify one or more autonomous systems (ASes), each of which may have an autonomous system number (ASN), and each of which may be associated in a BGP routing table with network addresses comprising a network address group. For respective nodes of the network associated with a network entity (e.g., having a network address within the network address group of the network entity), activities of the node interacting with the device may be evaluated to determine the desirability of the activity. Moreover, a network entity trust rating may be assigned to the network entity based on the evaluated activities of the nodes controlled by the network entity. The network entity trust rating may then be used to determine a level of filtering of nodes controlled by the network entity (e.g., any node having a network address within the network address group associated with the network entity.) In this manner, the activities of a node may be attributed to many nodes controlled by the network entity, such that a perpetrator of undesirable activity may be unable to avoid filtering by switching to a different network address that is controlled by the same network entity (e.g., a different IP address associated with the same domain.) These techniques may be particularly effective because the routing tables stored by various routers according to the border gateway protocol (BGP) may be difficult for perpetrators to alter without interfering with the connectivity of the nodes to the network.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
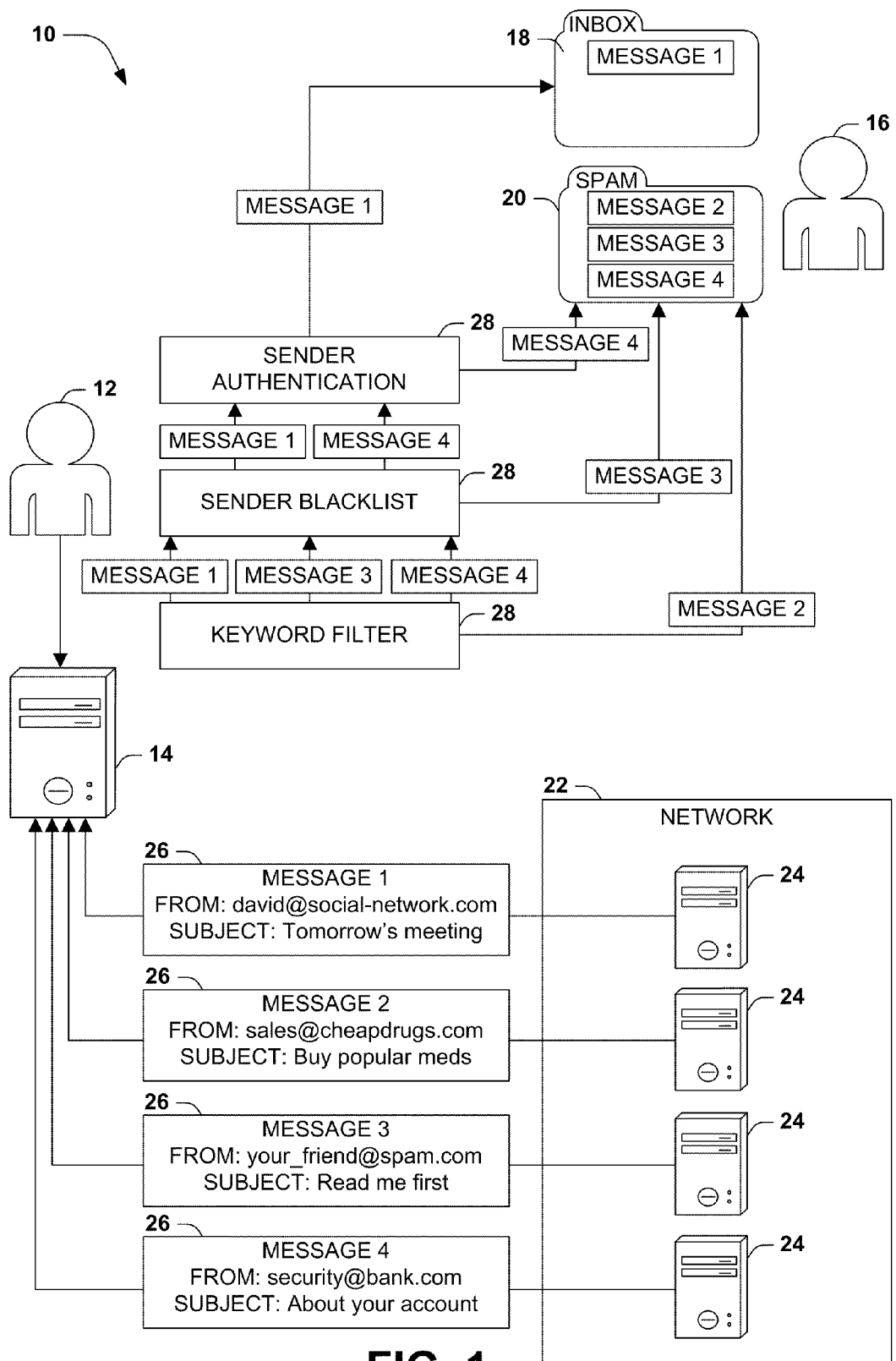
FIG. 1 is an illustration of an exemplary scenario featuring activities comprising email messages sent by nodes interacting over a network with a device comprising an email server and a filtering of such activities by the device.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Within the field of computing, many scenarios involve the communication of a device (such as a server, a router, a firewall, a workstation, a notebook, a smartphone, or a network appliance) with various nodes (each node comprising another device) over a wired or wireless network. However, along with the proliferation of advantageous uses of network communication, many uses of network communication have been developed that are undesirable to an owner of the device. As a first example, the device may comprise an email server configured to receive email messages from various nodes and addressed to users of the device. However, some of the nodes may send unsolicited bulk email messages ("spam") to the device, and the device may filter the received email messages to reduce the delivery of spam to users. As a second example, the device may comprise a webserver configured to receive and fulfill web requests received from users of other nodes, but some such requests may be disingenuous and intended to consume the resources of the webserver (e.g., a denial-of-service attack.) The webserver may be configured to identify and fulfill genuine requests in order to provide productive web service, while disregarding disingenuous requests. As a third example, the device may be exposed via the network to some nodes that attempt to deliver malware (e.g., "trojan" software that surreptitiously commandeers a portion of the computing resources of the device on behalf of another individual, such as by joining a "botnet" comprising a network of commandeered devices under the control of the other individual.) The device may utilize various techniques to reduce contact from potentially malicious nodes, such as a stateless or stateful firewall that excludes types of contact that are likely to be illegitimate.

In these and other scenarios, an operator of the device may endeavor to configure the device to utilize various forms of filtering of activity of various nodes of the network that attempt to interact with the device. The operator may seek to employ one or more filtering techniques that achieve a high accuracy of excluding undesirable activity while reducing the mis-identification and exclusion of desirable activity ("false positives"), and while conserving computing resources (e.g., network bandwidth, memory and processor usage, and processing delays in evaluating the activity.) Thus, while more aggressive filtering may result in the exclusion of a higher percentage of undesirable activity (such as the rerouting of spam email messages to a "spam" email folder instead of to users' inbox folders), the consequences of false positives (e.g., non-spam messages incorrectly routed to the "spam" email folder) and/or the consumption of computing resources may be too costly. Therefore, efficient and accurate filtering techniques are desirable in configuring devices to filter the activity of nodes interacting with the device.

In particular, email servers are often configured to reduce the delivery of "spam" to users by utilizing a combination of filtering techniques. Content-based filters may be utilized to examine email messages received from various nodes for indicators of unsolicited bulk email; e.g., spam email messages may be highly correlated with particular keywords, such as the names of popular pharmaceuticals that are often offered for sale via spam email messages. Sender-based filters may also be utilized to identify senders of email messages that are known to send large amounts of spam. For example, some "phishing" spammers endeavor to send email that appears to originate from various trusted senders, such as banks, auction sites, and software sites, and that include a hyperlink that leads to a false representation of the website of the sender that captures valuable data provided by the user (e.g., account identifiers and passwords) and delivers such data to another individual. In order to detect and reduce "phishing" email messages, an email server may be configured to identify email messages that appear to originate from such trusted websites, and to contact the trusted website to verify the contents of the email message before delivering the email message to the recipient(s). By using a combination of these and other techniques, an email server may be configured to filter the activities of various nodes that send email messages to the email server, thereby differentiating legitimate email messages from various types of spam. Email messages that are identified with a high degree of probability of comprising spam may be processed through various other techniques, such as dropping the email message (e.g., silently discarding the email message), bouncing the email message back to the sender (e.g., not delivering the email message to a recipient, but instead sending back to the sender a non-delivery report ("NDR") indicating that the message was not delivered), notifying the user that the email message may be spam, delivering the email message to a "spam" email folder instead of the inbox email folder of the user, delaying the receipt of the email message from the node (thereby imposing a penalty on the node that reduces the rate of delivering spam email messages in bulk, while not significantly affecting the delivery of legitimate email messages), and "time travel" (upon identifying an email message as spam, identifying similar email messages within the inboxes of other users that have not yet been read or seen by the users, and removing such email messages before delivery, or even after a user has seen, read, or received the email message delivery, viewing seen, and read by the users.)

FIG. 1 presents an exemplary scenario 10 featuring a device 14 configured to utilize various filtering techniques 28 to evaluate some activities initiated with the device 14 by various nodes 24 of a network 22. In this exemplary scenario 10, the device 14 comprises an email server that is configured by a user 12 (such as a network administrator) to receive email messages 26 addressed to a client 16, and to deliver such email messages 26 to the client 16 in various folders. Furthermore, the device 14 is configured to utilize various filtering techniques 28 to differentiate spam email messages from non-spam email messages, to deliver non-spam email messages 26 to the client 16 through an inbox folder 18, and to deliver spam email messages 26 to the client 16 through a spam folder 20. In this manner, the client 16 may receive and review the non-spam email messages 26, and may also receive the spam email messages 26 in a separate location that may be reviewed by the client 16, e.g., in order to retrieve false positives (non-spam email messages 26 that have been incorrectly identified as spam email messages 26.)

In the exemplary scenario 10 of FIG. 1, the device 14 receives four email messages 26 from four different nodes 24 of the network 22, and endeavors to filter these activities of the nodes 24 to identify and remove spam email messages 26. The device 14 may evaluate all four email messages 26 with a first filtering technique 28 comprising a keyword filter that identifies keywords that are highly correlated with spam email messages 26 (e.g., the term "popular meds" in the second email message 26), and that routes email messages 26 containing such keywords to the spam folder 20 of the email account of the client 18. The device 14 may next evaluate the remaining three email messages 26 with a second filtering technique 28 comprising a sender blacklist, which identifies a list of senders that are known to send high volumes of spam email messages 26 (e.g., "your_friend@spam.com", the sender of the third email message 26), and that routes email messages 26 sent from such senders to the spam folder 20 of the email account of the user 18. The device 14 may next evaluate the remaining two email messages 26 with a third filtering technique 28 comprising sender authentication 28, which identifies often-impersonated senders (e.g., "security@bank.com", the sender of the fourth email message) which contacts the senders in order to authenticate such email messages 26, and which routes unverified email messages 26 impersonating these senders to the spam folder 20 of the email account. As a result of these filtering techniques 28, the device 14 presents to the client 16 an inbox folder 18 containing the single genuine email message 26, and a spam folder 20 containing the email messages 26 that have been identified as spam.

One technique that may be utilized to filter activities relates to the evaluation of activities received from a particular node 24 interacting with the device 14, where the node 24 is identified on the network 22 according to a network address (e.g., an internet protocol (IP) address selected by or assigned to the node 24.) The device 14 may be configured to evaluate activities received from a particular network address; if these activities are determined to be undesirable, the device 14 may more heavily filter subsequent activities received from the network address, or may altogether block communication with the network address.

Figures 2, 3:
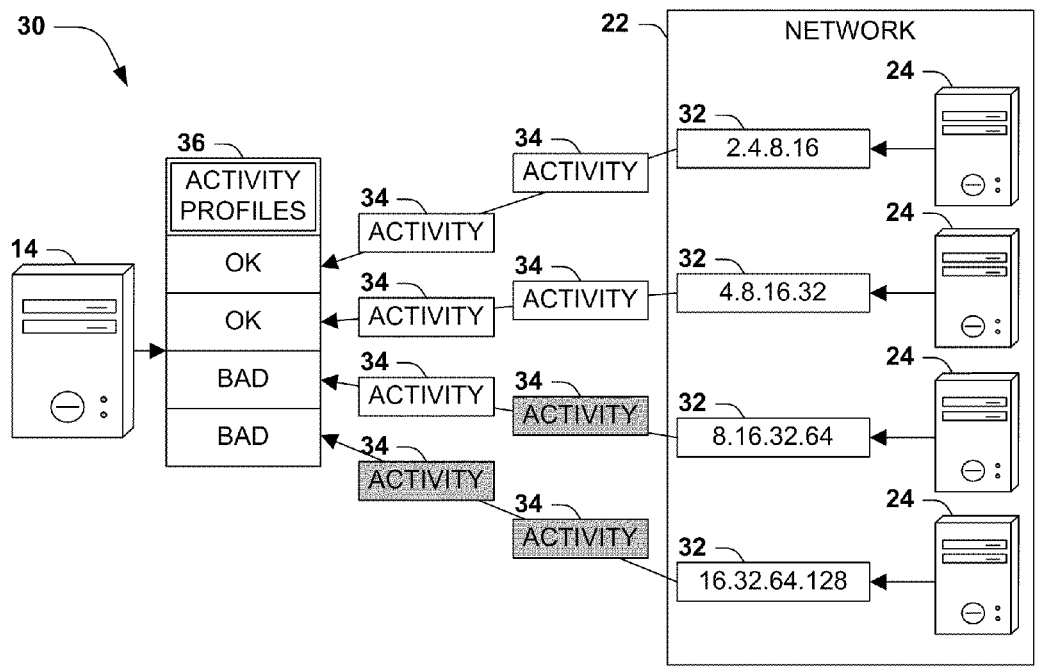
FIG. 2 is an illustration of another exemplary scenario featuring activities sent by nodes interacting over a network with a device and a filtering of such activities by the device.
FIG. 3 is an illustration of an exemplary scenario featuring activities sent by nodes interacting over a network with a device and a filtering of such activities by the device according to the techniques presented herein.

FIG. 2 presents an exemplary scenario 30 featuring an evaluation of activities 34 received from various nodes 24 of a network 22 interacting with a device 14. Respective nodes 24 may be identified according to a network address 32 associated with the node 24 for communicating over the network 22. The device 14 may comprise an activity profiles set 36 that, for respective network addresses 32, indicates an evaluation of the activities 34 received from the node 24 using the network address 32. For example, the device 14 may comprise an email server configured to receive email messages from the nodes 24; for respective network addresses 32, the device 14 may be configured to evaluate how many email messages received from the node 24 using the network address 32 are spam email messages (illustrated in the exemplary scenario 30 of FIG. 2 as activities 34 having dark shading) and are not spam email messages (illustrated in the exemplary scenario 30 of FIG. 2 as activities 34 having no shading.) Based on this evaluation, the device 14 may assign to each network address 32 an activity profile 36 indicating whether the activities 34 received from the network address 32 are generally good or generally bad. The device 14 may then filter subsequent activities 34 received from a node 24 based on the activity profile 36 of the network address 32 associated with the node 24. Nodes 24 associated with good activity profiles 36 may be more lightly filtered (e.g., by transmitting email messages received from the node 24 with less stringent evaluation of the spam content of respective email messages), while nodes 24 associated with bad activity profiles 36 may be more heavily filtered (e.g., by subjecting email messages received from the node 24 to more rigorous spam evaluation before delivery to a client 16.) In this manner, the device 14 may evaluate the activities 34 received from the node 24, and may use the evaluation to determine how to filter activities 34 subsequently received from the network address 32 associated with the node 24.

While the evaluation of activities 34 received from various nodes 24 of the network 22 as in the exemplary scenario 30 of FIG. 2 may enable a more informative evaluation and more accurate filtering of the nodes 24, one potential problem with the exemplary scenario 30 of FIG. 2 is the relative ease in switching a node 24 to a new network address 32 if its current network address 32 is identified as having a bad activity profile 36. In some scenarios, an individual (such as a spammer, a hacker, or a botnet operator) may license a potentially large range of network addresses 32 (e.g., an entire range of IP addresses beginning with the numbers "16.32", comprising a total of 65,536 network addresses 32.) If a network address 32 used by a node 24 is identified as associated with a bad activity profile 36 that suggests heavier filtering of activities 34 received from the node 24, the individual may switch the node 24 to a new network address 32 that does not have a bad activity profile 36, and may resume the sending of activities 34. The delivery of undesirable activities 34 may be only briefly diminished during the switch to a new network address 32, and may continue with only a brief interruption, thereby reducing the effectiveness of the technique illustrated in the exemplary scenario 30 of FIG. 2.

Presented herein are alternative techniques for evaluating the activities 34 of nodes 24 of a network 22 that may be resistant to switches in network addresses 32 of a node 24 upon identifying a high volume of undesirable activities 34 issuing therefrom. According to these techniques, it may be possible to associate one or more nodes 24 with a network entity, such as a network operator, company, organization, or government responsible for controlling the nodes 24. As a first example, this identification may involve identifying an autonomous system number (ASN) of a network entity controlling a particular set of nodes 24. As a second example, this identification may involve identifying a network name shared in common among several nodes 24, such as a similar set of domain names that are assigned to the network addresses 32 of a set of nodes 24. If a set of nodes 24 may be identified as associated with a particular network entity, it may be possible to evaluate activities 34 of the nodes 24 controlled thereby to determine the desirability of the activities 34. Moreover, it may be observed that an individual seeking to distribute undesirable activities may be able to switch a particular node 24 quickly to a new network address 32 controlled by the network entity, but may have more difficulty in switching the node 24 to a network address 24 associated with a different network entity (e.g., because such switching may be complicated or expensive to achieve.) For example, for respective network addresses 32 (such as IP addresses), activities 34 received from the network address 32 may be evaluated. Moreover, several network addresses 32 may be identified as controlled by a particular network entity, and the evaluations of activities 34 of the nodes 24 using such network addresses 32 may be aggregated to generate a network entity trust rating. This network entity trust rating may subsequently be applied to several or all nodes 24 controlled by the network entity, even for nodes 24 that have not previously sent activities 34 to the device 14. In this manner, the evaluation of activities 34 received from particular nodes 24 controlled by a particular network entity may be ascribed to other or all nodes 24 controlled by the network entity. An individual seeking to avoid this determination may have difficulty in reconfiguring the node 24 to utilize a network address 32 having a higher trust rating that is untainted by the previously received activities 34, thereby improving the filtering of the node 24 to reduce the receipt of undesirable activities 34.

FIG. 3 presents an exemplary scenario 40 featuring a "rolling-up" or aggregating of activity evaluations 44 of various nodes 24 of a network 22 controlled by a particular network entity, in order to attribute a network entity trust rating 48 to the network entity and to filter all nodes 24 controlled by the network entity according to the network entity trust rating 48. In this exemplary scenario 40, a device 14 is configured to receive email messages from various nodes 24, and to identify received email messages (representing activities 34 received from various nodes 24) as spam email messages or not spam email messages. The device 14 may record the number of each type of email message received from each node 24 having a particular network address 32 (e.g., according to at least one IP address of the node 24.) For a particular node 24, the device 14 may evaluate the activities 34 of the node 24 to determine the desirability of the activities 34. Moreover, particular network addresses 32, comprising a network address group, may be identified as reserved for a particular network entity 46, such as an autonomous system identified by an autonomous system number (ASN). The device 14 may be capable of parsing a registry, such as a border gateway protocol (BGP) routing table utilized by a routing device of the network 22, to identify the ASN associated with a network address group that includes the network address 32 of the node 24. Accordingly, the results of the evaluations of the desirability of activities 34 received from various nodes 24 may be "rolled up" or aggregated into a network entity trust rating 48 that is assigned to respective network entities 46. The device 14 may then filter activities 34 received from any particular node 24 by identifying the network entity 46 controlling the network address 32 of the node 24 by retrieving the network entity trust rating 48 of the network entity 46, and by applying a degree of filtering to the node 24 based on the network entity trust rating 48 of the network entity 46 controlling the node 24. In contrast with the exemplary scenario 30 of FIG. 2, the techniques illustrated in the exemplary scenario 40 of FIG. 3 may be resistant to the reassignment of network addresses 32 to a node 24 by an individual wishing to continue sending undesirable activities 34 after being identified as such.

Figure 4:
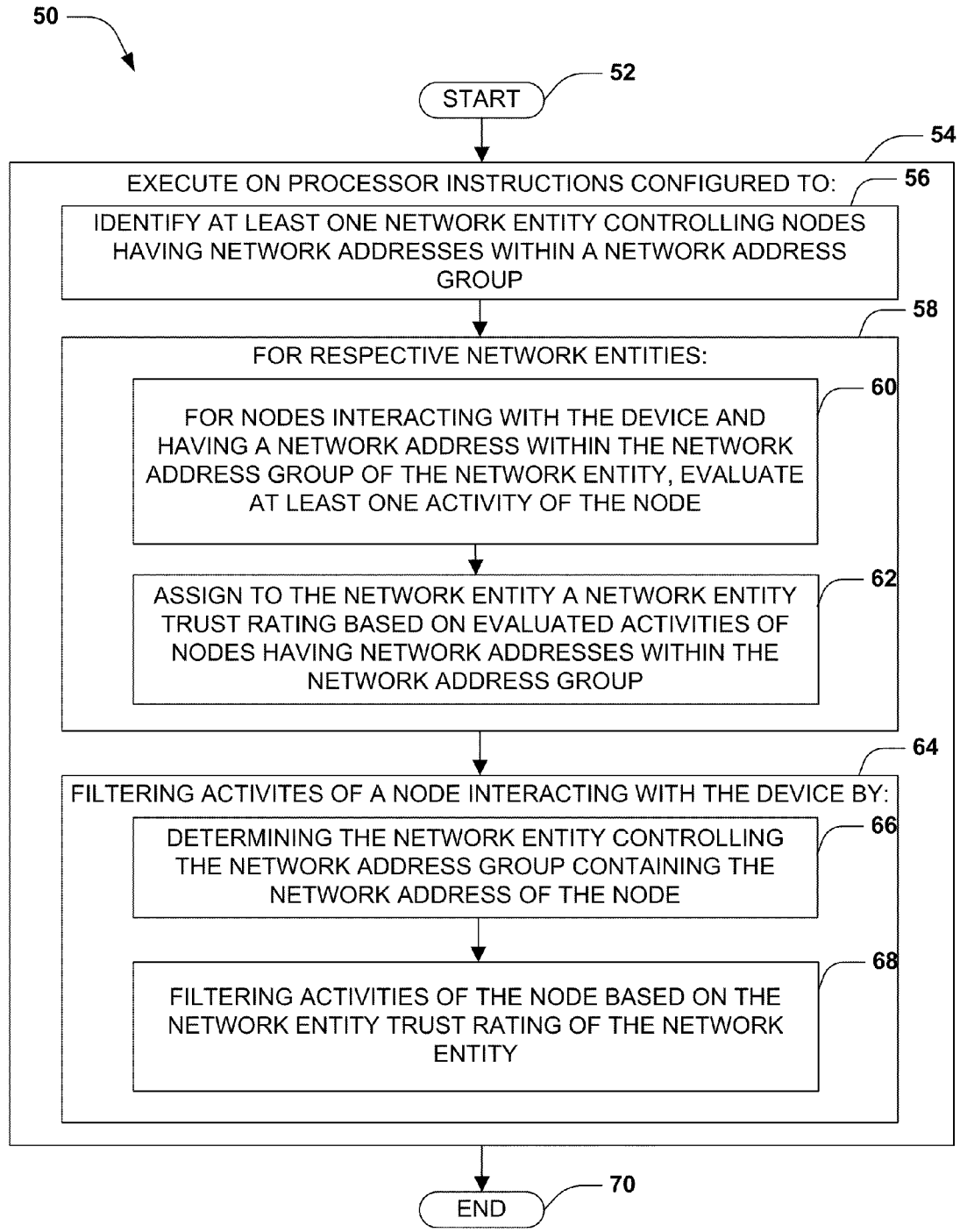
FIG. 4 is a flow chart illustrating an exemplary method of filtering activities of nodes interacting with a device.

FIG. 4 presents a first embodiment of the techniques presented herein, illustrated as an exemplary method 50 of filtering activities 34 of nodes 24 interacting with a device 14 having a processor, where respective nodes 24 are connected to the device 14 through a network 22 and have a network address 32. The exemplary method 40 may comprise, e.g., software instructions stored in a volatile or non-volatile memory of the device 14, such as a hard disk drive, a flash memory device, or an optical disc. The exemplary method 50 begins at 52 and involves executing 54 on the processor instructions configured to implement the techniques presented herein. In particular, the instructions may be configured to identify 56 at least one network entity 46 controlling nodes 24 having network addresses 32 within a network address group. The instructions may also be configured to, for respective network entities 58, and for nodes 24 interacting with the device 14 and having a network address 32 within the network address group of the network entity 46, evaluate 60 at least one activity 34 of the node 24. The instructions may also be configured to, for respective network entities 58, assign 62 to the network entity 46 a network entity trust rating 48 based on evaluated activities 34 of the nodes 24 having network addresses 32 within the network address group of the network entity 46. The instructions may also be configured to filter 64 activities 34 of a node 24 interacting with the device 14 by determining 66 the network entity 46 controlling the network address group containing the network address 32 of the node 24, and by filtering 68 activities 34 of the node 24 based on the network entity trust rating 48 of the network entity 46. In this manner, the instructions cause the device 14 to filter the activities 34 of the nodes 24 according to the techniques presented herein, and so the exemplary method 50 ends at 70.

Figure 5:
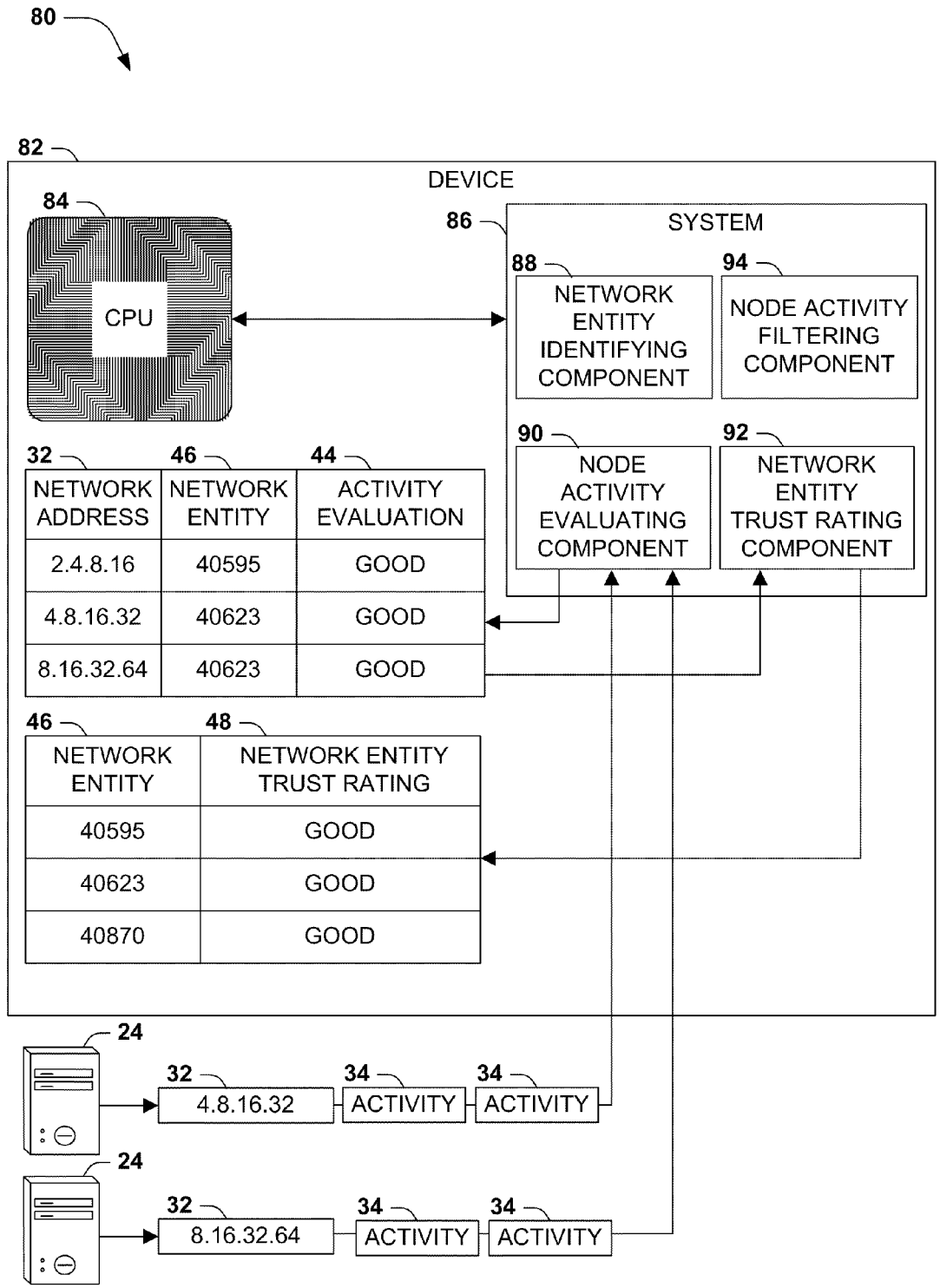
FIG. 5 is a component block diagram illustrating an exemplary system for filtering activities of nodes interacting with a device.

FIG. 5 presents a second embodiment of these techniques, illustrated as an exemplary system 86 executing on a device 82, and configured to filter activities 34 of nodes 24 interacting with the device 82. The nodes 32 may be connected to the device 82 through a network 22, and may respectively have a network address 32 for communicating over the network 22. The exemplary system 86 may comprise, e.g., a software architecture stored in a volatile or nonvolatile memory and comprising components that are respectively configured to implement various aspects of the techniques herein. In the exemplary scenario 80 of FIG. 5, the exemplary system 86 comprises a network entity identifying component 88, which is configured to identify at least one network entity 46 controlling nodes 24 having network addresses 32 within a network address group. The exemplary system 86 also comprises a node activity evaluating component 90, which is configured to, for nodes 24 interacting with the device 14 and having a network address 32 within the network address group of a network entity 46, evaluate at least one activity 34 of the node 24. The exemplary system 86 also comprises a network entity trust rating component 92, which is configured to, for respective network entities 46, assign to the network entity 46 a network entity trust rating 48 based on the evaluated activities 34 of nodes 24 having network addresses 32 within the network address group of the network entity 46. The exemplary system 86 also comprises a node activity filtering component 94, which is configured to filter activities 34 of a node 24 interacting with the device 82 by determining the network entity 46 controlling the network address group containing the network address 32 of the node 24, and by filtering activities 34 of the node 24 based on the network entity trust rating 48 of the network entity 46. In this manner, the exemplary system 86 configures the device 82 to filter the activities 34 of nodes 24 interacting with the device 82 according to the techniques presented herein.

Figure 6:
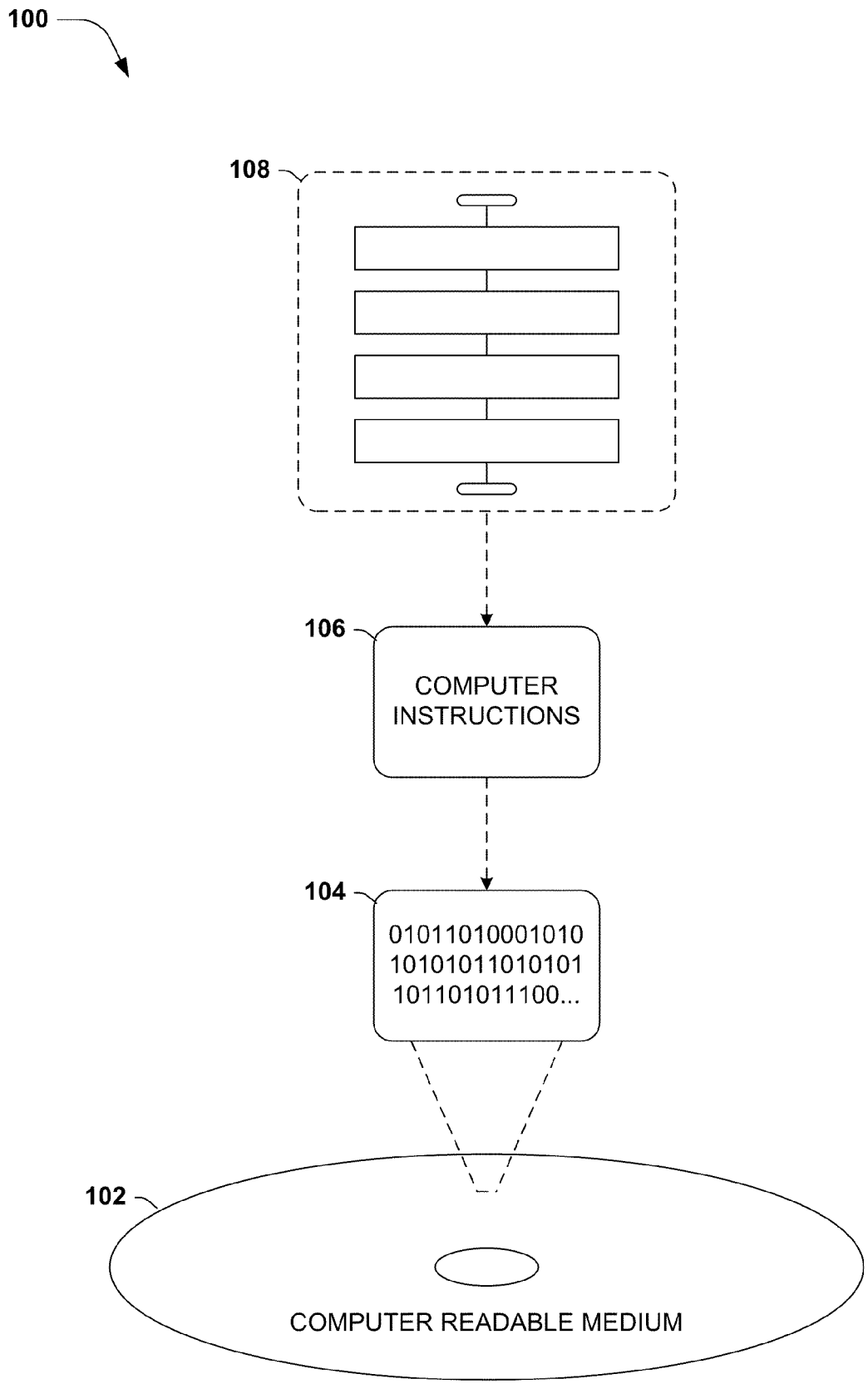
FIG. 6 is an illustration of an exemplary computer-readable medium comprising processor-executable instructions configured to embody one or more of the provisions set forth herein.

Still another embodiment involves a computer-readable medium comprising processor-executable instructions configured to apply the techniques presented herein. An exemplary computer-readable medium that may be devised in these ways is illustrated in FIG. 6, wherein the implementation 100 comprises a computer-readable medium 102 (e.g., a CD-R, DVD-R, or a platter of a hard disk drive), on which is encoded computer-readable data 104. This computer-readable data 104 in turn comprises a set of computer instructions 106 configured to operate according to the principles set forth herein. In one such embodiment, the processor-executable instructions 106 may be configured to perform a method of filtering activities of nodes interacting with a device, such as the exemplary method 50 of FIG. 4. In another such embodiment, the processor-executable instructions 106 may be configured to implement a system for filtering activities of nodes interacting with a device, such as the exemplary system 86 of FIG. 5. Some embodiments of this computer-readable medium may comprise a nontransitory computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

The techniques presented herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 50 of FIG. 4 and the exemplary system 86 of FIG. 5) to confer individual and/or synergistic advantages upon such embodiments.

A first aspect that may vary among embodiments of these techniques relates to the scenarios wherein the techniques presented herein may be utilized. As a first example, the techniques may be used to filter many types of activities received by many types of devices, including email messages received by an email server; text messages received by a text messaging server, such as a chat server or a simple messaging service (SMS) server; social network messages received by a social network server; web request received by a webserver, such as weblog posts received by a weblog server; database queries received by a database server; and invocations of services received by various types of servers, such as accesses of files on a file server.

As a second example of this first aspect, the activities 34 may be received from many types of nodes 24 interacting with the device 14. As a first variation, a node 24 may comprise a device legitimately operated by a user 12, such as an individual, a group of individuals, an organization, a corporation, a government, or even a fully autonomous device that sends legitimate activities 34 to the device 14. As a second variation of this second example, a node 24 may be configured by a user 12 to distribute undesirable activities 34 to the device 14, such as a spam email server, a distributor of various forms of malware, or a phishing server that attempts to impersonate a trusted server in order to extract sensitive information from unsuspecting visitors. As a third variation of this second example, a node 24 may have been accidentally misconfigured by a user 12 in a manner that generates undesirable activities 34 (e.g., an email server that accidentally sends huge numbers of a particular email message to the device 14, or that has been misconfigured as an open relay that is exploited by a spam email server to redeliver large volumes of spam email messages.) As a fourth variation of this second example, a node 24 may be legitimately operated by a user 12 and may therefore generate some legitimate activities 34, but may have been commandeered by malware to generate undesirable activities 34 (e.g., a node 24 may send legitimate web requests to a device 14 comprising a webserver, but may also have been infected with malware that attempts to deliver large volumes of spam messages and/or perform denial-of-service attacks against the device 14 and/or other nodes 24 of the network 22.)

As a third example of this first aspect, the techniques may be implemented through many types of architectures. In a first variation of this third example, the components of the exemplary method 50 of FIG. 4 may be performed in different concurrent or consecutive orders; e.g., identifying 56 a network entity 46 controlling various nodes 24 may be delayed until activity of a node 24 identifying the network entity 46 is received. In a second variation of this third example, the architecture of the exemplary system 86 of FIG. 5 may vary in many different ways; e.g., a single component may perform an activity evaluation 44 of various nodes 32 and also assign the network entity trust rating 48 to the network entity 46 based on the activity evaluation 44. The device might also comprise a plurality of interconnected and interoperating devices, such as a set of network servers comprising a network farm that presents a website to various users. Those of ordinary skill in the art may devise many variations in the scenarios and architectures wherein the techniques presented herein may be implemented.

A second aspect that may vary among embodiments of these techniques relates to the manner of evaluating activities 34 of a node 24. As a first example, an embodiment of these techniques may evaluate the content of the activities 34 of the node 24; e.g., an email server may evaluate the contents of email messages received from various nodes 24 based on keywords or patterns in the email message that are highly correlated with spam email messages, and a webserver may evaluate the contents of web requests to differentiate legitimate web requests that may be productively fulfilled from disingenuous web requests sent as part of a denial-of-service attack.

As a second example of this second aspect, an embodiment of these techniques may evaluate various activity properties of various activities 34 of the node 24, where such activity properties comprise metadata about the activities 34 of the node 24, such as a result of a holistic evaluation of the activities 34. Activity properties that may be relevant to this evaluation may be selected from an activity property set comprising: spam message reports, which may relate to at least one spam message sent by the node 24 (e.g., records of a number of positively identified spam messages sent by the node 24, which may be sent by a recipient who has determined that the sender is delivering spam email messages, and possibly including statistics on the volume of spam email messages being sent by the node 24); non-spam message reports (e.g., notifications that email messages sent by the node have been verified as legitimate, non-spam email messages); phishing reports, which may relate to phishing attempts initiated by the node 24; and malware reports, which may relate to malware items that may be stored by the node 24 and may be transmitted to other devices. Other activity properties that may be relevant to the evaluation of the activities 34 of the node 24 comprise various metrics, such as message metrics relating a volume of messages sent by the node 24 (e.g., where high rates of message sending may be indicative of bulk unsolicited email messages); recipient metrics, relating to the number of recipients of at least one message sent by the node 24 (e.g., where messages having a high number of recipients may be indicative of bulk unsolicited email messages); and returned message metrics, relating to the number or rate of returned messages sent to the node 24 in response to a message sent by the node 24 (e.g., where high rates of bounced messages may be indicative of bulk unsolicited email messages.) Still other metrics that may be relevant to the evaluation of the node 24 include sender authentication failures, relating to messages sent by the node 24 where verification of the sender by a recipient subsequently failed (e.g., which may be indicative of attempted impersonation of individuals); connection metrics relating to the number of connections established by the node 24 (e.g., where high numbers of connections may be indicative of bulk unsolicited email messages); and bandwidth metrics relating to network bandwidth utilized by the node 24 (e.g., where high usage of upload bandwidth may be indicative of a denial-of-service attack against another node 24 over the network 22.) Moreover, these activity properties may be detected by the device 14, and/or may be detected by another device (e.g., a centralized tracking database of well-known spammers) and transmitted to the device 14 for use in evaluating the activities 34 of the node 24. Other activity properties, such as other types of reports and metrics, may also be useful in evaluating the activities 34 of a node 24 to determine an activity evaluation.

As a third example of this second aspect, the activity evaluation 44 of a node 24 may be based on various network properties exhibited by the node 24, which may be indicative of the type, configuration, and uses of the node 24 for distributing desirable or undesirable activities 34. Such network properties may be selected from a network property set comprising a name registry comprising a network name of the node 24 (e.g., some name registries, such as domain registrars, may be tolerant of nodes 24 distributing undesirable activities 34, and may even facilitate such distribution by quickly reassigning the network name of a node 24 in order to avoid identification of the node 24 as distributing the undesirable activities 34.) Such network properties might also include the network port status of at least one network port of the node 24 (e.g., an open port 25 on a node 24 may be indicative of an open mail relay that may be exploitable by a spam email server to retransmit large volumes of spam messages as activities 34 to the device 14), a geographic location of the node 24 (e.g., where a node 24 hosted in a first geographic area may be more or less trustworthy than a node 24 hosted in a second geographic area), and/or at least one property of at least one network route associated with at least one network address 32 of the node 24 (e.g., the node 24 may be hosted within a virtual private network that is more or less trustworthy than nodes 24 outside of the virtual private network, and this factor may be identified according to the network route involved in reaching the node 24 over the network 22.) Such network routes may be determined, e.g., by evaluating the results of a routing path trace performed over the network 22.

As a fourth example of this second aspect, the activity evaluation 44 of the node 24 may be based on at least one user property of at least one user 12 of the node 24, where some users 12 or types of users 12 may be more or less trustworthy than other users 12 or types of users 12. The user properties may be selected from a user property set comprising a geographic location of the user 12 (e.g., where users located in a first geographic region may be more or less trustworthy, than users located in a second geographic region); a user type of the user 12 (e.g., a node 24 utilized by a government or a public corporation may be more trustworthy than a node 24 utilized by a private corporation or an individual); a reputation of the user 12 (e.g., some users 12 may have verifiable identities associated with trustworthy reputations that suggest a higher trust level to be ascribed to nodes 24 operated by the user 12, while other users 12 may have reputations of distributing undesirable activities 34, such as notorious spammers); and a financial status indicator of the user 12 (e.g., nodes 24 operated by a publicly traded corporation with high revenue streams may be more trustworthy than nodes 24 operated by bankrupt or struggling corporations or unknown corporations with indeterminate revenue streams.)

As a fifth example of this second aspect, many types of evaluation may be applied to these various types of information about the activities 34 and the nodes 24 in order to evaluate the activities 34 of a node 24. As a first variation of this fifth example, an embodiment of these techniques may evaluate the activities 34 of a node 24 by querying a user to evaluate one or more activities 34 (e.g., the user may be queried to identify spam messages by examining the contents of various messages sent by a node 24), and, upon receiving from the user an activity evaluation of the node, achieving the activity evaluation 44 of the node 24. In other variations of this fifth example, various automated techniques may be utilized, such as the rule-based filtering techniques 28 illustrated in the exemplary scenario 10 of FIG. 1. In a second variation of this fifth example, a node activity classifier may be configured to evaluate the activities 34 of various nodes 24, and an embodiment of these techniques may use the node activity classifier to select a node activity classification of respective activities 34 of a node 24, and may generate the activity evaluation 44 of the node 24 based on the selected node activity classifications. For example, a classifier technique, such as a Bayesian network, an artificial neural network, a set of heuristics, or an expert system, may be configured to evaluate various properties of an email message and to output a node activity classification identifying the email message as a spam email messages or a non-spam email message, and an embodiment of these techniques may use the node activity classifications of the classifier to evaluate the activities 34 of a node 24 and to generate an activity evaluation 44 of the node 24. As a third such variation, a network entity classifier may be configured to generate activity evaluations 44 of various nodes 24 in order to generate a network entity classification (e.g., a legitimate network, a spam network, a peer-to-peer network, or a botnet), and an embodiment of these techniques may use the network entity classifier to evaluate the activities 34 of the nodes 24 controlled by a network entity 46 and to assign the network entity trust rating 48 of the network entity 46 based on a network entity classification.

Figure 7:
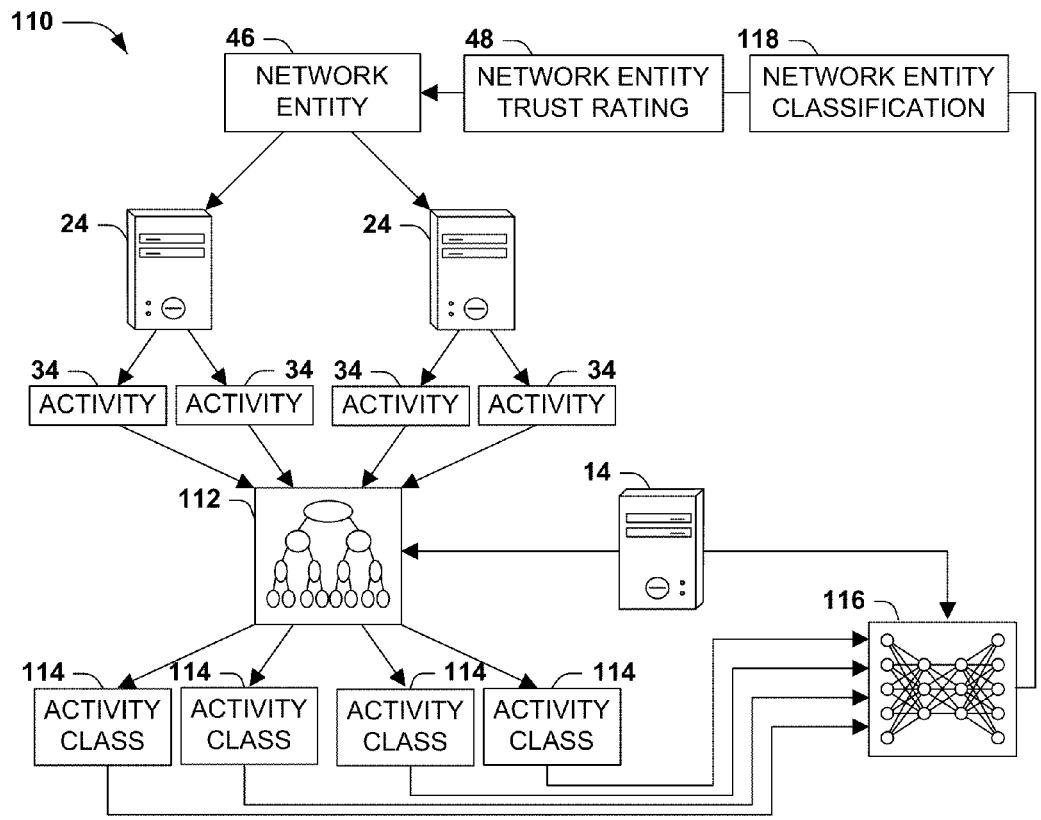
FIG. 7 is an illustration of an exemplary scenario featuring a classification of activities and a network entity based on various automated classifiers.

FIG. 7 presents an exemplary scenario 110 featuring the use of various types of classifiers in the evaluation of activities 34 of nodes 24 controlled by a network entity 46 and the assignment of a network entity trust rating 48 to the network entity 46 based upon the use of such classifiers. In this exemplary scenario 110, a network entity 46 controls two nodes 24, each of which interacts with a device 14 featuring an embodiment of these techniques in order to transmit various activities 34 (e.g., email messages that may or may not be unsolicited bulk email messages.) The device 14 may have access to a node activity classifier 112, comprising a Bayesian network configured to evaluate respective activities 34 and to select a node activity classification 114 based thereupon (e.g., a classification of the email message as a spam email message or not a spam email message.) The device 14 may therefore apply the node activity classifier 112 to the activities 34 received from the nodes 24, and for respective activities 34 may select a node activity classification 114 generated by the node activity classifier 112. As a result, the device 14 has access to various classifications of the activities 34 of the nodes 24 that may be relevant to evaluating the activities 34 of the respective nodes 24. Alternatively or additionally, the device 14 may have access to a network entity classifier 116, comprising an artificial neural network that is configured to evaluate the node activity classifications 114 of various nodes 24 controlled by the network entity 46 and to generate a network entity classification 118 (e.g., based on the types of activities performed by the nodes, the network entity 46 may be classified as a legitimate network, a peer-to-peer network, a spam email network, or a botnet.) Accordingly, the device 14 may apply the network entity classifier 116 to the node activity classifications 114 generated by the node activity classifier 112, and may thereby generate a network entity classification 118 of the network entity 46. This network entity classification 118 may therefore be used to assign a network entity trust rating 48 to the network entity 46.

A third aspect that may vary among embodiments of these techniques relates to the manner of determining a network entity 46 controlling a particular node 24. As a first example, the network entity 46 may be determined by evaluating a routing table identifying at least one network entity 46 and at least one network address 32 of at least one node 24 controlled by the network entity 46. This may be achieved, e.g., by evaluating a border gateway protocol (BGP) routing table stored by a routing device of the network 22, which may associate various nodes 24 with a controlling network entity 46 (e.g., by identifying a network address group allocated to an autonomous system (AS) identified by an autonomous system number (ASN), where the network address group contains the network address 32 of the node 24.) Because the network routes identified for communicating with a particular node 24 may be difficult to alter without disrupting network communication to the node 24, the information within these routing tables maybe comparatively up-to-date and reliable for determining a network entity 46 controlling a particular node 24. As a second example, the network entity 46 may be registered with a name registry (e.g., a domain name service or a WHOIS service) that is configured to associate node names with respective nodes 24 of the network 22. An embodiment of these techniques may be capable of determining the network entity 46 controlling a particular node 24 by identifying a node name of the node 24 according to the name registry, and by associating the node name of the node 24 with a network entity 46 according to the name registry. For example, a domain name service may be configured to associate nodes 24 controlled by a network entity 46 for a particular corporation with a domain name related to the name of the corporation (e.g., a particular store existing as a network entity 46 may register many controlled nodes 24 with the domain name service as having various node names comprising variations of "store.com".) Those of ordinary skill in the art may devise many ways of identifying a network entity 46 controlling a particular node 24 of the network 22 while implementing the techniques presented herein.

A fourth aspect that may vary among embodiments of these techniques relates to the manner of filtering activities of a node 24 based on the network entity trust rating 48 of the network entity 46 controlling the node 24. As a first example, upon determining that at least one network address 32 of a node 24 is within a network address group controlled by a network entity 46 having a poor network entity trust rating 48, an embodiment of these techniques may be configured to block activities 34 received from the node 24 (e.g., by refusing any and all connections initiated by the node 24 with the device 14 over the network 22.) Alternatively, particular types of activities 34 may be blocked. For example, a node 24 that is misconfigured as an open relay may be exploited to retransmit large volumes of spam messages, but may otherwise generate legitimate activities 34; accordingly, an embodiment of these techniques may be configured to block email received from the node 24, but to accept other types of activities 34 sent by the node 42.

As a second example of this fourth aspect, upon determining that at least one network address 32 of a node 24 is within a network address group controlled by a network entity 46 having a poor network entity trust rating 48, an embodiment of these techniques may be configured to reduce at least one service of the device 14 provided to the node 24. For example, network bandwidth of connections established between the node 24 and the device 14 over the network may be throttled; the lag of such connections may be increased; and a service usage quota may be reduced (e.g., an email server may filter an email service used by a node 24 or user 12 to transmit spam messages may be restricted to a low limit of email messages that may be transmitted, such as no more than 50 sent messages per day.)

As a third example of this fourth aspect, upon determining that at least one network address 32 of a node 24 is within a network address group controlled by a network entity 46 having a poor network entity trust rating 48, an embodiment of these techniques may be configured to increase the filtering of the activities of the node 24. For example, if a node 24 is identified as sending large volumes of spam messages to the device 14, the device 14 may implement more rigorous spam evaluation techniques to achieve more successful exclusion of spam messages sent by the node 24.

As a fourth example of this fourth aspect, specific types of filtering may be utilized by a device 14 comprising an email server and configured to receive activities 34 comprising email messages from other nodes 24, where the email messages may or may not comprise spam email messages. In this scenario, upon determining that at least one network address 32 of a node 24 sending email messages to the device 14 is within a network address group controlled by a network entity 46 having a poor network entity trust rating 48 due to the delivery of a high volume of spam email messages, the device 14 may apply various email filtering techniques. Such techniques may be selected from an email filtering techniques set including dropping the email message (e.g., silently discarding the spam email message); bouncing the email message back to the node 24; junking the email message (e.g., delivering the email message to a client 16 within a spam folder 20, such as illustrated in the exemplary scenario 10 of FIG. 1); quarantining the email message (e.g., notifying a client 16 addressed as a recipient of the email message that a spam email message has been received but blocked); and delaying receipt of the email message (thereby imposing a time penalty on nodes 24 endeavoring to deliver a high rate of spam email messages.) Those of ordinary skill in the art may devise many ways of filtering the activities 34 of various nodes 24 based on the network entity trust rating 48 of the controlling network entity 46 while implementing the techniques presented herein.

A fifth aspect that may vary among embodiments of these techniques relates to additional actions that may be performed in relation to the evaluation of activities 34, the assignment of trust ratings to nodes 24 and network entities 46, and the filtering of activities 34 based on the trust ratings. As a first example of this fifth aspect, an embodiment of these techniques maybe configured to exchange information about trust ratings assigned to nodes 24 and/or network entities 46 with other devices, such as other trusted servers, in order to implement a distributed or broad consensus of trust ratings. In a first such variation, upon identifying a network entity trust rating 48 of a network entity 46, an embodiment of these techniques may be configured to notify at least one trusted device of the network entity trust rating 48 assigned to the network entity 46. For example, a device 14 implementing these techniques may generate and circulate to other devices a network entity trust ratings list that indicates various network entity trust ratings 48 assigned by an embodiment of these techniques to various network entities 46. In a second such variation, an embodiment of these techniques may be configured to receive at least one network entity trust rating 48 from a trusted device, and to assign to a network entity 46 a network entity trust rating 46 based on both the activity evaluations 44 of nodes 24 within the network address group of the network entity 46 and the network entity trust rating 48 received from the trusted device. In this manner, a device 14 and an embodiment of these techniques implemented thereupon may exchange trust ratings assigned to various nodes 24 and/or network entities 46 in order to pool determinations of trust ratings among trusted devices.

Figure 8:
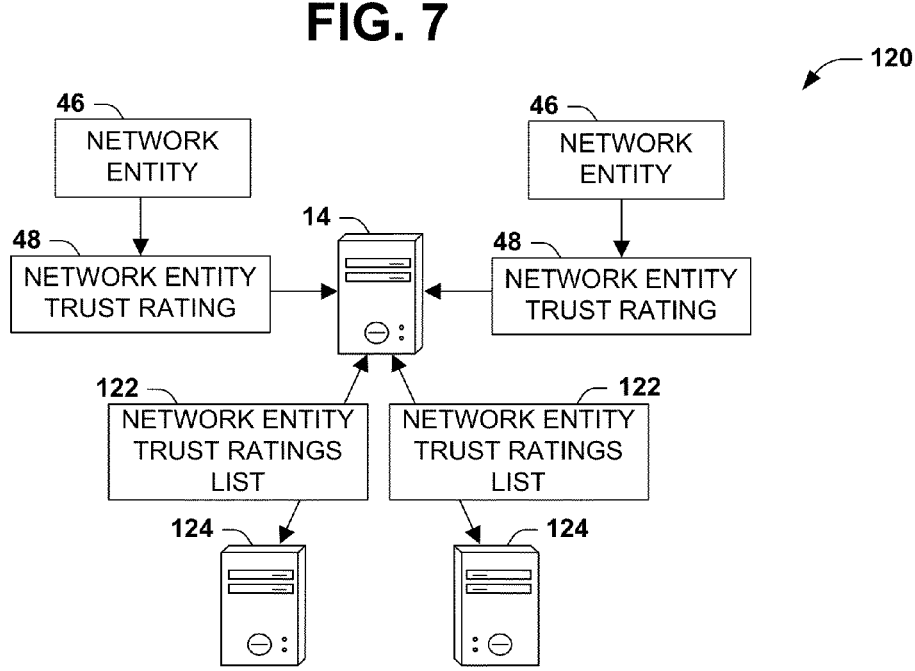
FIG. 8 is an illustration of an exemplary scenario featuring a sharing of assigned network entity trust ratings among trusted device.

FIG. 8 presents an exemplary scenario 120 featuring a sharing of network entity 48 trust ratings. A device 14 comprising an embodiment of these techniques may generate various network entity trust ratings 48 for respective network entities 46 according to the techniques presented herein. The device 14 may then generate a network entity trust ratings list 122, which may be shared with various trusted devices 124 (e.g., by sending the network entity trust ratings list 122 to the trusted devices 124, by receiving network entity trust ratings lists 122 from the other devices 124 and merging the network entity trust ratings 48 specified therein with those assigned by the device 14, and/or by synchronizing the network entity trust ratings 48 assigned by the device 14 with those assigned by the trusted devices 124 in order to generate a mutually acceptable network entity trust ratings list 122.) In these and other scenarios, the device 14 may coordinate with other trusted devices to share information relating to the trust ratings of various network entities 46.

As a second example of this fifth aspect, additional actions relating to the assignment of network entity trust ratings 48 and/or activity evaluations 44 may be taken following the assignment thereof to a network entity 46 or node 24. For example, the activities and types of nodes 24 and network entities 46 may change over time (e.g., a node 24 that is misconfigured as an open relay that is exploited to retransmit spam email messages may be reconfigured by a user 12 to close the open relay, thereby improving the activities 34 of the node 24; conversely, a formerly trusted node 24 may be infected with malware that begins generating large volumes of undesirable activities 34.) Accordingly, after assigning a network entity trust rating 48 to a network entity 46, an embodiment of these techniques may be configured to, for nodes 24 interacting with the device 14 and controlled by the network entity 46, evaluate at least one subsequent activity 34 of the node 24 in order to assign an updated activity evaluation 44 of the node 24, and may assign to the network entity 46 an updated network entity trust rating 48 based on the updated activity evaluation 44. In this manner, the embodiment may maintain the freshness of the trust ratings assigned to various network entities 46 and nodes 24 based on changes to the activities 34 thereof. Those of ordinary skill in the art may devise many ways of evaluating the activities 34 of various nodes 24 and network entities 46 while implementing the techniques presented herein.

A third example of this fifth aspect relates to a trustworthy node 24 generating legitimate activities 34 that may be controlled by a network entity 46 having a poor network entity trust rating 48. In some scenarios, a network entity 46 may be assigned a poor trust rating (e.g., if several nodes 24 controlled by the network entity 46 are commandeered by malware or form a botnet, or if the network entity 46 is comparatively tolerant of undesirable activities 34 of controlled nodes 24, such as the transmission of spam.) However, the assignment of the poor trust rating to the network entity 46 may be unfair to one or more nodes 24 that generate legitimate and desirable activities 34 while interacting with the device 14, because such a node 24 may be more heavily filtered than warranted by the activity evaluation 44 of the node 24. For example, a network entity 46 that is determined to host nodes that are sending a high volume of spam email messages may result in heavy filtering of email messages received from any node 24 controlled by the network entity 46. However, such heavy filtering may result in a rise in false positives (e.g., non-spam email messages that are incorrectly identified as spam email messages), thereby unfairly penalizing one or more nodes 24 that send only non-spam email messages.

In such scenarios, an embodiment of these techniques may implement an "auto-rescue" feature to permit a node 24 to be "rescued" from overly heavy filtering due to a lower trust rating assigned to the controlling network entity 46 of the node 24 than the trust rating assigned to the node 24. For example, upon identifying a node 24 having at least one network address 32 within a network address group controlled by a network entity 46, where the node 24 has a higher level of trust determined from the activity evaluation 44 than the network entity trust rating 48 of the network entity 46, an embodiment of these techniques may be configured to filter the activities 34 of the node 24 based on the activity evaluation 44, rather than the lower network entity trust rating 48. For example, less stringent email filtering may be applied to a node 24 having a high level of trust arising from the activity evaluation 44 (based on sending a low volume of spam email messages), even if more stringent email filtering is applied to other nodes 24 of the same controlling network entity 46 that have poorer activity evaluations 44 that are not higher than the network entity trust rating 48 of the controlling network entity 46.

Figure 9:
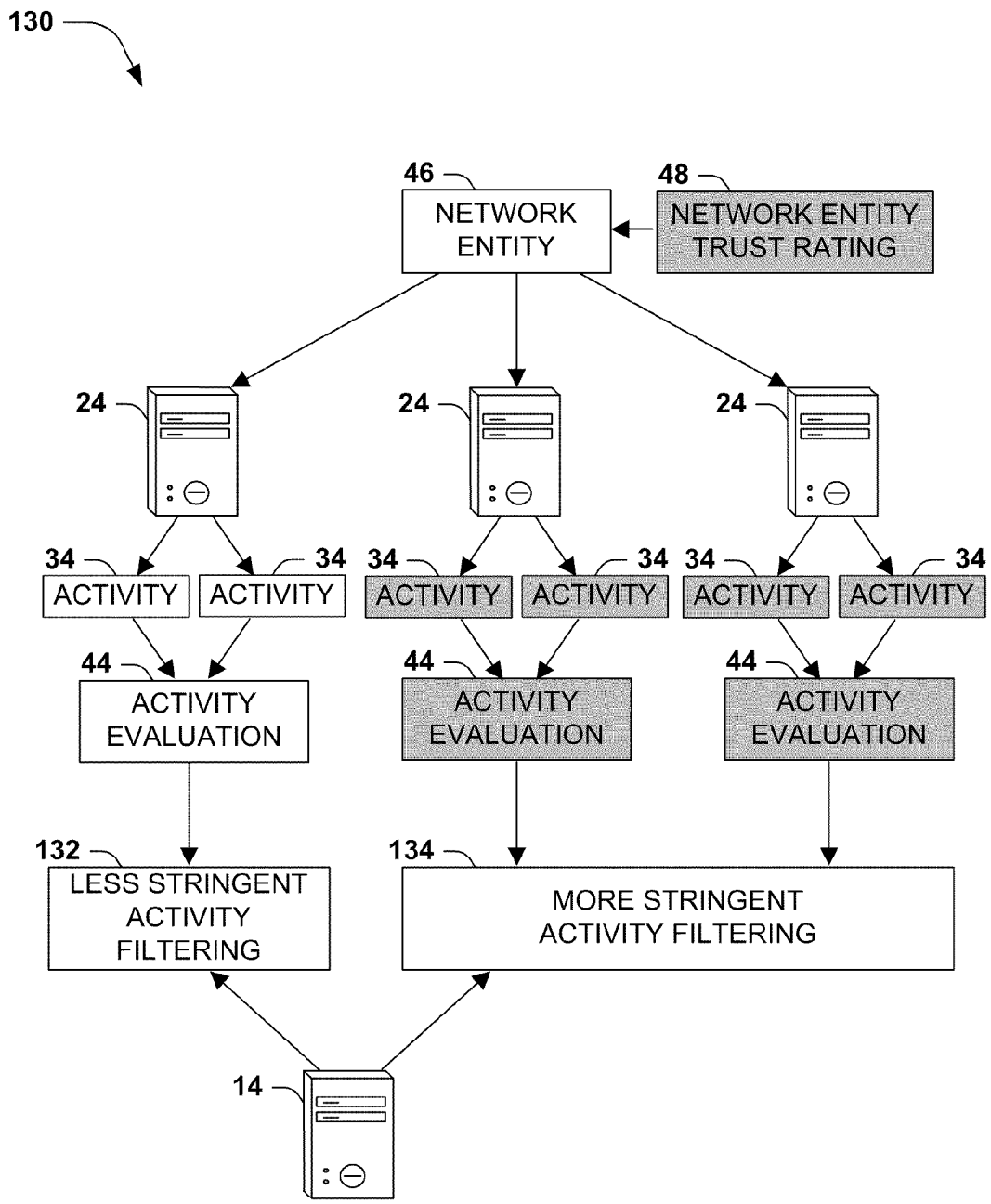
FIG. 9 is an illustration of an exemplary scenario featuring an "auto-rescue" feature providing an appropriate level of filtering for a node having a higher activity evaluation than the network entity trust rating of the controlling network entity.

FIG. 9 presents an illustration of an exemplary scenario 130 including an "auto-rescue" feature that may be implemented in an embodiment of these techniques operating on a device 14 in order to apply appropriate levels of activity filtering to various nodes 24 controlled by a network entity 46. In this exemplary scenario 130, the network entity 46 may be comparatively tolerant of undesirable activities 34 performed by some nodes 24 controlled by the network entity 46 (e.g., the network entity 46 may be comparatively tolerant of spammers sending large volumes of spam email messages.) Accordingly, the embodiment may assign to various nodes 24 a poor activity evaluation 44 (illustrated as activity evaluations 44 having dark shading), and based on these activity evaluations 44, may also assign a poor network entity trust rating 48 to the network entity 46. These poor activity evaluations 44 and network entity trust ratings 48 may cause the device 14 to filter subsequent activities 34 received from these and other nodes 24 controlled by the network entity 46 using more stringent activity filtering techniques 134. However, one node 24 controlled by the network entity 46 may be operated by a user 12 to generate only legitimate and desirable activities 34 while interacting with the device 14, and may have been determined an activity evaluation 44 that is higher than the network entity trust rating 48 of the network entity 46. Accordingly, an embodiment of these techniques may identify the higher activity evaluation 44 of the node 24 as compared to the network entity trust rating 48 of the network entity 46, and may apply less stringent activity filtering techniques 132 to the activities 34 of the node 24. In this manner, the embodiment may automatically "rescue" the node 24 from unduly heavy activity filtering that might have resulted from the poorer network entity trust rating 48 of the network entity 46 controlling the node 24. Those of ordinary skill in the art may implement many additional features, such as many variations of "auto-rescue" features, in implementations of the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 10:
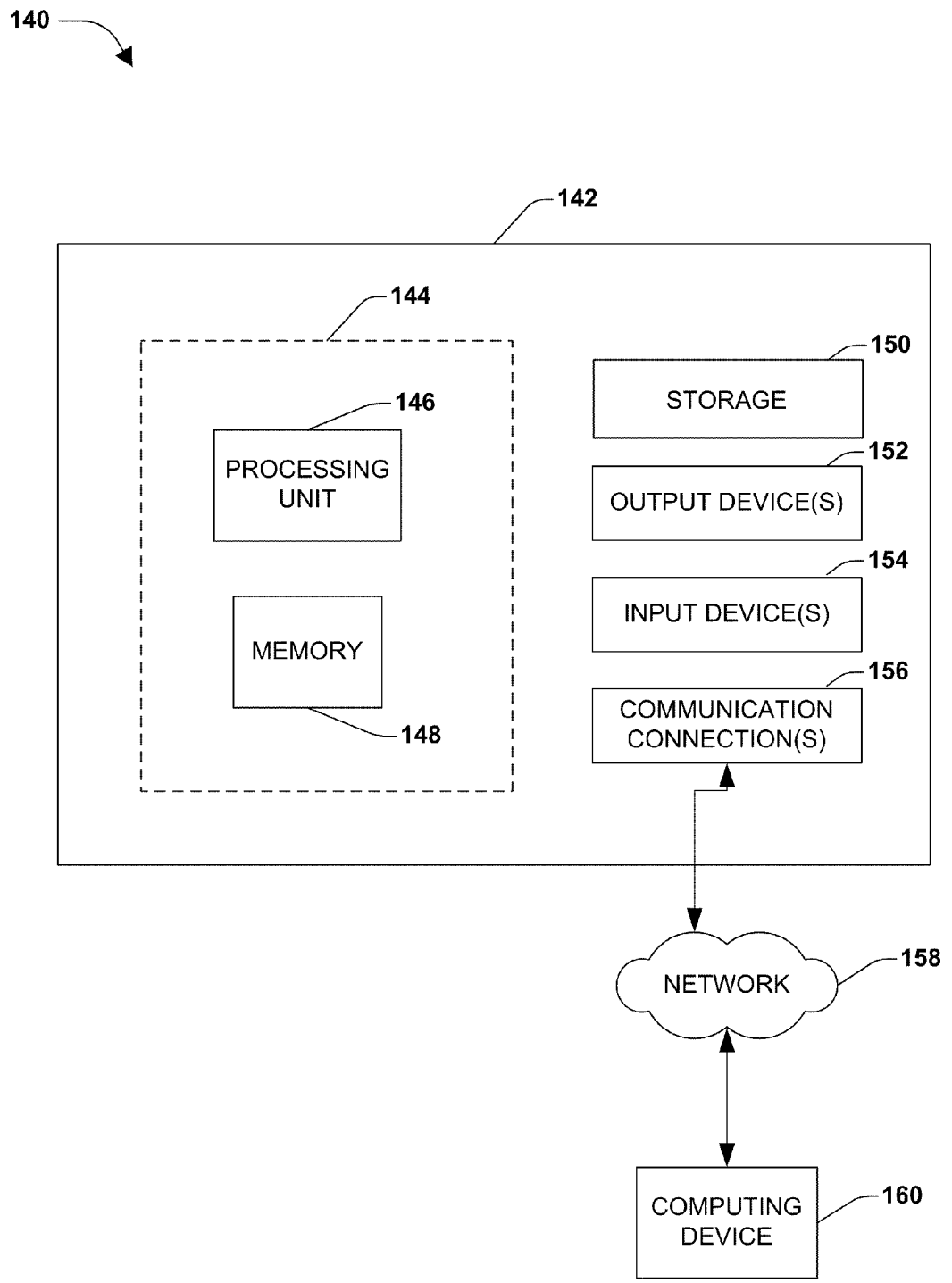
FIG. 10 illustrates an exemplary computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 140 comprising a computing device 142 configured to implement one or more embodiments provided herein. In one configuration, computing device 142 includes at least one processing unit 146 and memory 148. Depending on the exact configuration and type of computing device, memory 148 may be volatile (such as RAM, for example), non-volatile (such as ROM, flash memory, etc., for example) or some combination of the two. This configuration is illustrated in FIG. 10 by dashed line 144.

In other embodiments, device 142 may include additional features and/or functionality. For example, device 142 may also include additional storage (e.g., removable and/or non-removable) including, but not limited to, magnetic storage, optical storage, and the like. Such additional storage is illustrated in FIG. 10 by storage 150. In one embodiment, computer readable instructions to implement one or more embodiments provided herein may be in storage 150. Storage 150 may also store other computer readable instructions to implement an operating system, an application program, and the like. Computer readable instructions may be loaded in memory 148 for execution by processing unit 146, for example.

The term "computer readable media" as used herein includes computer storage media. Computer storage media includes volatile and nonvolatile, removable and non-removable media implemented in any method or technology for storage of information such as computer readable instructions or other data. Memory 148 and storage 150 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 142. Any such computer storage media may be part of device 142.

Device 142 may also include communication connection(s) 156 that allows device 142 to communicate with other devices. Communication connection(s) 156 may include, but is not limited to, a modem, a Network Interface Card (NIC), an integrated network interface, a radio frequency transmitter/receiver, an infrared port, a USB connection, or other interfaces for connecting computing device 142 to other computing devices. Communication connection(s) 156 may include a wired connection or a wireless connection. Communication connection(s) 156 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 142 may include input device(s) 154 such as keyboard, mouse, pen, voice input device, touch input device, infrared cameras, video input devices, and/or any other input device. Output device(s) 152 such as one or more displays, speakers, printers, and/or any other output device may also be included in device 142. Input device(s) 154 and output device(s) 152 may be connected to device 142 via a wired connection, wireless connection, or any combination thereof. In one embodiment, an input device or an output device from another computing device may be used as input device(s) 154 or output device(s) 152 for computing device 142.

Components of computing device 142 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 142 may be interconnected by a network. For example, memory 148 may be comprised of multiple physical memory units located in different physical locations interconnected by a network.

Those skilled in the art will realize that storage devices utilized to store computer readable instructions may be distributed across a network. For example, a computing device 160 accessible via network 158 may store computer readable instructions to implement one or more embodiments provided herein. Computing device 142 may access computing device 160 and download a part or all of the computer readable instructions for execution. Alternatively, computing device 142 may download pieces of the computer readable instructions, as needed, or some instructions may be executed at computing device 142 and some at computing device 160.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of filtering activities of nodes interacting with a device having a processor and having access to a border gateway protocol routing table, the nodes connected to the device through a network and respectively having a network address, the method comprising:
   executing on the processor instructions configured to:
      for respective network entities represented by an autonomous system number in the border gateway protocol routing table:
         for respective nodes interacting with the device:
            evaluate at least one activity of the node; and
            assign to the node a node trust rating based on evaluated activities of the node; and
         assign to the network entity a network entity trust rating based on evaluated activities of the nodes having a network address associated, according to the border gateway protocol routing table, with the autonomous system number of the network entity; and
      filter activities of a node interacting with the device by:
         determining, according to the border gateway protocol routing table, the network entity having an autonomous system number associated with the network address of the node;
         comparing the network entity trust rating of the network entity with the node trust rating assigned to the node;
         if the node has been assigned a node trust rating that is higher than the network entity trust rating of the network entity, filtering activities of the node based on the node trust rating rather than the network entity trust rating; and
         if the node has not been assigned a node trust rating that is higher than the network entity trust rating of the network entity, filtering activities of the node based on the network entity trust rating of the network entity.

2. The method of claim 1, at least one activity of the node interacting with the device selected from an activity set comprising:
   sending at least one email message to the device;
   sending at least one text message to the device;
   sending at least one social network message to the device;
   sending at least one weblog post to the device; and
   utilizing at least one service of the device.

3. The method of claim 1, evaluating the at least one activity of the node comprising: evaluating at least one activity property of at least one activity of the node, the at least one activity property selected from an activity properties set comprising:
   a spam message report relating to at least one spam message sent by the node;
   a non-spam message report relating to at least one non-spam message sent by the node;
   a phishing report relating to at least one phishing attempt initiated by the node;
   a malware report relating to at least one malware item stored by the node;
   a message metric of messages sent by the node;
   a recipient metric of recipients of at least one message sent by the node;

a returned message metric of returned messages sent to the node in response to at least one message sent by the node;

a sender authentication failure of at least one sender of at least one message sent by the node;

a connection metric of connections established by the node; and a bandwidth metric of bandwidth utilized by the network.

4. The method of claim 1, comprising: generating an activity evaluation of the node based on at least one network property exhibited by the node, the at least one network property selected from a network property set comprising:

a name registry comprising a network name of the node;

at least one network port status of at least one network port of the node;

a geographic location of the node; and at least one property of at least one network route associated with at least one network address of the node.

5. The method of claim 1, comprising: generating an activity evaluation of the node based on at least one user property of at least one user of the node, the at least one user property selected from a user property set comprising:

a geographic location of the user;

a user type of the user;

a reputation of the user; and a financial status indicator of the user.

6. The method of claim 1, comprising: generating an activity evaluation of the node by:

querying a user to evaluate at least one activity of the node, and upon receiving from the user an activity evaluation of the node, assigning the activity evaluation to the node.

7. The method of claim 1, comprising: generating an activity evaluation of the node by:

selecting a node activity classification of the activity of the node using a node activity classifier configured to evaluate activities of nodes, and assigning the activity evaluation to the node based on the node activity classification.

8. The method of claim 1, assigning the network entity trust rating of the network entity comprising:

selecting a network entity classification of the activity of the node using a network entity classifier configured to evaluate network entities based on activity evaluations of nodes having network addresses associated with the autonomous system number of the network entity according to the border gateway protocol routing table, and assigning the network entity trust rating of the network entity based on the network entity classification.

9. The method of claim 1, comprising: notifying at least one trusted device of at least one network entity trust rating of at least one network entity.

10. The method of claim 1, assigning the network entity trust rating of at least one network entity comprising:

receiving at least one network entity trust rating from at least one trusted device, and assigning to the network entity a network entity trust rating based on activity evaluations of nodes having a network address associated, according to the border gateway protocol routing table, with an autonomous system number of the network entity, and the network entity trust rating received from the at least one trusted device.

11. The method of claim 1, comprising: after assigning a network entity trust rating to a network entity:

for nodes interacting with the device and having a network address associated, according to the border gateway protocol routing table, with an autonomous system number of the network entity, evaluating at least one subsequent activity of the node to assign an updated activity evaluation to the node; and upon detecting an updated activity evaluation of at least one node, assign to the network entity an updated network entity trust rating based on the updated activity evaluation.

12. The method of claim 1, filtering the activity of the node comprising: upon determining that at least one network address of the node is associated, according to the border gateway protocol routing table, with an autonomous system number of a network entity having a poor network entity trust rating, blocking activities received from the node.

13. The method of claim 1, filtering the activity of the node comprising: upon determining that that the is associated, according to the border gateway protocol routing table, with an autonomous system number of a network entity having a poor network entity trust rating, reducing at least one service of the device provided to the node.

14. The method of claim 1, filtering the activity of the node comprising: upon determining that is associated, according to the border gateway protocol routing table, with an autonomous system number of a network entity having a poor network entity trust rating, increasing filtering of at least one activity of the node.

15. The method of claim 14:

the activity of the node comprising at least one email message sent to the device, and filtering the activity of the node comprising: upon determining that the node is associated, according to the border gateway protocol routing table, with an autonomous system number of a network entity having a poor network entity trust rating, applying at least one email filtering technique selected from an email filtering techniques set comprising:

dropping the email message;

bouncing the email message to the node;

junking the email message;

quarantining the email message;

delaying the email message.

16. The method of claim 1, wherein assigning the node trust rating to the node further comprises:

after assigning a network entity trust rating to the network entity of the node:

evaluate at least one subsequent activity of the node; and upon determining that the at least one subsequent activity of the node indicates a higher level of trust for the node than the network entity trust rating of the network entity, assign to the node a node trust rating that is higher than the network entity trust rating of the network entity.

17. A system configured to filter activities of nodes interacting with a device having a memory device and a processor and having access to a border gateway protocol routing table, the nodes connected to the device through a network and respectively having a network address, the system comprising:

a node activity trust rating component comprising instructions stored in the memory device that, when executed on the processor, cause the device to, for nodes interacting with the device and having a network address associated, according to the border gateway protocol routing table, with the autonomous system number of a network entity:

evaluate at least one activity of the node; and
assign to the node a node trust rating based on evaluated activities of the node;
a network entity trust rating component comprising instructions stored in the memory device that, when executed on the processor, cause the device to, for respective network entities, assign to the network entity a network entity trust rating based on evaluated activities of nodes having network addresses associated, according to the border gateway protocol routing table, with the autonomous system number of the network entity; and
a node activity filtering component comprising instructions stored in the memory device that, when executed on the processor, cause the device to filter activities of a node interacting with the device by:
  determining the network entity having an autonomous system number associated, according to the border gateway protocol routing table, with the network address of the node; and
  comparing the network entity trust rating of the network entity with the node trust rating assigned to the node;
    if the node has been assigned a node trust rating that is higher than the network entity trust rating of the network entity, filtering activities of the node based on the node trust rating rather than the network entity trust rating; and
    if the node has not been assigned a node trust rating that is higher than the network entity trust rating of the network entity, filtering activities of the node based on the network entity trust rating of the network entity.

18. The system of claim 17, the instructions of the node activity trust rating component configured to generate the activity evaluation of the node by:
  selecting a node activity classification of the activity of the node using a node activity classifier configured to evaluate activities of nodes, and
  assigning the activity evaluation to the node based on the node activity classification.

19. The system of claim 17, the instructions of the network entity trust rating component configured to assign the network entity trust rating of the network entity by:
  selecting a network entity classification of the activity of the node using a network entity classifier configured to evaluate network entities based on activity evaluations of nodes having network addresses associated with the autonomous system number of the network entity according to the border gateway protocol routing table, and
  assigning the network entity trust rating of the network entity based on the network entity classification.

20. A memory device storing instructions that, when executed on a processor of a device having access to a border gateway protocol routing table, cause the device to filter activities of nodes interacting with the device through a network, by:
  for respective network entities represented by an autonomous system number in the border gateway protocol routing table:
    for respective nodes interacting with the device:
      evaluate at least one activity of the node; and
      assign to the node a node trust rating based on evaluated activities of the node; and
    assigning to the network entity a network entity trust rating based on evaluated activities of the nodes having a network address associated, according to the border gateway protocol routing table, with the autonomous system number of the network entity; and
  filtering activities of a node interacting with the device by:
    determining, according to the border gateway protocol routing table, the network entity having an autonomous system number associated with the network address of the node;
    comparing the network entity trust rating of the network entity with the node trust rating assigned to the node;
      if the node has been assigned a node trust rating that is higher than the network entity trust rating of the network entity, filtering activities of the node based on the node trust rating rather than the network entity trust rating; and
      if the node has not been assigned a node trust rating that is higher than the network entity trust rating of the network entity, filtering activities of the node based on the network entity trust rating of the network entity.

* * * * *